United States Patent [19]
Kenyon

[11] Patent Number: 5,569,345
[45] Date of Patent: Oct. 29, 1996

[54] FLEXIBLE IRON-ON PATCH FOR SOFT CLOTHING

[76] Inventor: Sarah Kenyon, 2291 W. Wycoff Rd., Ovid, N.Y. 14521

[21] Appl. No.: 226,268

[22] Filed: Apr. 11, 1994

[51] Int. Cl.$^6$ .................................. B32B 3/06; B32B 7/08
[52] U.S. Cl. .................................. 156/93; 2/122; 428/102
[58] Field of Search .................................. 156/93; 112/441, 112/417, 418, 266.1; 2/122; 428/102

[56] References Cited

U.S. PATENT DOCUMENTS

| | | | |
|---|---|---|---|
| 3,657,060 | 4/1972 | Haigh . | |
| 3,662,878 | 5/1972 | Conrad | 206/45.33 |
| 3,816,211 | 6/1974 | Haigh . | |
| 4,352,334 | 10/1982 | Childs | 112/266.1 |
| 4,517,910 | 5/1985 | Jalowsky | 112/266.1 |
| 4,981,742 | 1/1991 | Haigh | 428/102 |
| 5,149,388 | 9/1992 | Stahl | 156/250 |
| 5,327,840 | 7/1994 | Tajima | 112/121.11 |

OTHER PUBLICATIONS

Hudson, Peyton B., *Guide to Apparel Manufacturing*; Sparks Press, Raleigh, North Carolina (1988) pp. 171–200.
Farrel, Jacqueline, *The Vest Book*, Quarto Inc., London (1995) pp. 28–29, 92–93.

"Modern Textiles"–Dorothy Lyle (John Wiley & Sons 1977); pp. 27, 30 and 31.

"The Special Vocabulary of Textiles"–Irlene Stephens Paper presented before the Division of Chemical Literature, American Chemical Society, Apr. 7–12, 1957; pp. 13–14.

"America's Fabrics: Origin and History, Manufacture, characteristics and Uses"–Zelma Bendure and Gladys Pfeiffer (MacMillan Company 1946) pp. 628–631.

"The Modern Textile Dictionary"–George Linton (Little, Brown & Company 1955); p. 287.

*Primary Examiner*—Daniel Stemmer
*Attorney, Agent, or Firm*—Barnard, Brown & Michaels, P.C.

[57] ABSTRACT

A soft, flexible patch which will not fray, but which may be ironed on to the softest garments, especially suitable for decoration or reinforcement of fleece or flannel sweatsuits, as well as a method of manufacturing such a patch. The patch is made of a layer of fleece material such as flannel, bonded to a layer of heat-fusible transfer web. The patch is trimmed to a pattern and bound with thread using an overlock stitch of 2.5 to 5 stitch per cm density and approximately 5±2 mm depth.

7 Claims, 1 Drawing Sheet

//
U.S. Patent  Oct. 29, 1996  5,569,345
Fig. 1
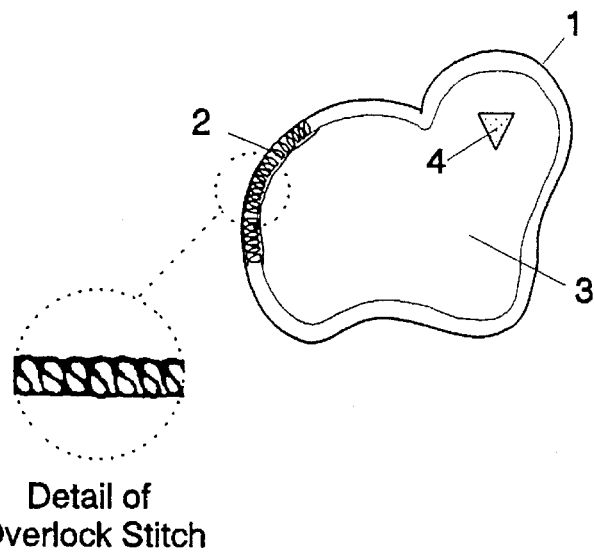
Fig. 1a
Detail of
Overlock Stitch
Fig. 2
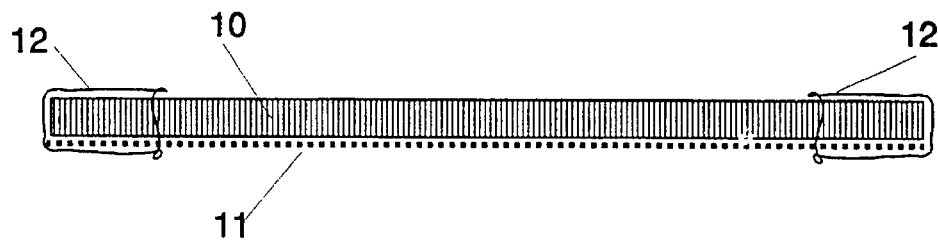

FLEXIBLE IRON-ON PATCH FOR SOFT CLOTHING

FIELD OF THE INVENTION

The invention pertains to the field of ornamentation or reinforcement for clothing. More particularly, the invention pertains to patches which are especially adapted to being applied to soft clothing such as sweatsuits or the like.

BACKGROUND OF THE INVENTION

Decorative patches for clothing have been known for many years. They were originally used for insignia for uniforms such as worn by military, police, or organization such as Boy or Girl Scouts. Such patches were often treated with varying stiffening agents, and were usually fully embroidered, adding to the stiffness. The edges were usually reinforced with fairly heavy stitching to force the patches to retain their shape.

Originally, and in most cases to this day, these patches were sewn on to the uniform garments. As the use of the patches became more widespread, however, it became common to attach the patches adhesively, which made decorative patches much more accessible. Haigh, U.S. Pat. Nos. 3,657,060 and 3,816,211, presents a patch and method of manufacture, respectively, which allows the patch to be attached through the use of a common household iron. This "iron-on patch" was introduced in the 1970's and has become the most common method of adhesive attachment of patches. Many Boy- and Girl-Scout patches are now supplied routinely in iron-on form.

In addition to the insignia type patch, the iron-on technology has been applied to reinforcing patches, originally intended for the knees of denim jeans. The knee patch branched out to elbows, seats, etc, and became something of a fashion item, especially for children's clothing.

In recent years patches, especially decorative patches, have become very popular among children and teens. In addition to the military insignia type patches, cartoon characters, sayings, and simple shapes are common. These patches are easily ironed on to the denim jeans or jackets or heavier shirts which children wear. However, they pose a problem for the Softer, more flexible clothing such as the fleece sweatsuits which have become popular in recent years.

The stiffness of the patch, which is a desirable attribute for police arm patches or the like which should retain their appearance after many washings, is a detriment when applied to soft sweatshirts. The clothing flexes easily, leaving the patch shelving out uncomfortably. When used as knee patches for sweatpants, the patch impedes bending of the pants and looks odd.

Several attempts have been made at softer patches for the softer clothing in recent years, but these have not been entirely successful. The patches must be made of thin or soft material, but this is difficult to sew on sweatsuits. Most iron-on adhesive is too thick and stiff for the softer fabrics.

If the edges of the patches are solidly bound as the older patches were, they become too stiff. If the edges of the patches are not bound, they fray. Prior art soft patches were sometimes supplied with unbound edges, with instructions to apply decorative craft paint to reduce fraying.

SUMMARY OF THE INVENTION

The invention presents a soft, flexible patch especially suitable for decoration or reinforcement of fleece or flannel sweatsuits, as well as a method of manufacturing such a patch.

The patch is made of a layer of fleece material of specific weight, bonded to a layer of transfer web. The patch is trimmed to a pattern and bound with thread using a specific stitch density and type.

This results in a soft, flexible patch which will not fray, but which may be ironed on to the softest sweatsuits.

BRIEF DESCRIPTION OF THE DRAWING

FIG. 1 shows a top view of a patch.

FIG. 1a shows a detail of the overlock stitch from FIG. 1.

FIG. 2 shows a cut-away side view of the patch, showing the layers.

DESCRIPTION OF THE PREFERRED EMBODIMENT

FIG. 1 shows an iron-on patch made according to the teachings of the invention. The patch shown represents a sheep. Because of the operation of the serging machine preferably used to cut and bind the patch, the design will have at most one interior (acute) angle, where the serger begins and ends the cutting/binding operation. Therefore, simple geometric shapes such as circles or ovals, or designs with only one interior angle, such as hearts or the sheep shown, will be preferred for the patches. However, shapes with sharp corners are possible within the teachings of the invention. Such patches may require stitching to the clothing after they are ironed on, in order to reinforce the corners and minimize fraying.

The body of the patch (3) may be of a single color, or simple designs might be printed on it, either as part of the fabric, or imprinted later. In the patch shown, a single dark inverted triangle (4) is printed on the patch to represent the sheep's face.

The edge of the patch (1), for a depth of approximately 5 mm, is bound with thread (2). The depth of the stitching is not critical—a range of 3 to 7 mm has been used without significant difference in the patch.

I have found that the "three thread overlock stitch" is preferred for this application, though other overlock stitches may also be used, such as the "four thread overlock", if desired.

It is important that the proper stitch density (number of stitches per linear cm of edge) be used. If the stitching is too dense (too many stitches per cm), the patch will be too stiff around the edge. If the density is too low (too few stitches per cm), the fabric will tend to fray around the stitches. I have found a stitch density of 2.5 to 5 stitches per cm will work for the method of the invention, with a preferred density of approximately 3 stitches per cm.

Note: Some serging machines are calibrated in "stitch length" (really the spacing between stitches) measured in mm per stitch. This is effectively the reciprocal of the stitch density measure: a density of 2.5 to 5 stitches per cm is the same as a stitch length of 2 to 4 mm per stitch.

FIG. 2 shows a cut-away side view of the patch of the invention. The edges are bound with thread (12) using an overlock stitch as described above.

The outer surface (10) of the patch (the surface visible when the patch is affixed to a garment) is made of a soft, flexible fabric, so as not to affect the wearability of the lightweight garment to which it is attached. The weight of this material is important. If it is too light, the thread used for binding the edges will tear out. If it is too heavy, it will be too stiff for the purpose.

I have found that fleece material is preferred for this application. It is available in a variety of colors and patterns from many suppliers, and can be easily cut and edged according to the teachings of the method of the invention. Fleece material is similar in texture and stiffness to the material of the common sweatsuit, and is thus most appropriate for decorative patches for children's sweatsuits. It will be understood that other fabrics, such as lightweight cotton or cotton-blend, would also be useful within the teachings of the invention, so long as their weight and handling characteristics were similar to the preferred fleece.

A "transfer web" of heat-fusible material (11) is bonded to the back of the patch (the side to be affixed to the garment). This transfer web must be heavy enough to allow the patch to bond to the garment when it is ironed on, but must not significantly increase the stiffness of the fabric used for the outer surface. I have found Pellon® Wonder-Under® 100% polyamide transfer web, with a weight of 24 grams/meter, available from Freudenberg Nonwovens, 119 West 40th Street, New York, N.Y. 10018, to be ideal for this application.

The method of making the patch of the invention is as follows:

First, a sheet of the transfer web is bonded to the rear surface of the flexible fabric chosen for the patch. In the case of the Wonder-Under~ transfer web, this is done by placing the paper-backed transfer web on the fabric and pressing the combination through the paper with a hot, dry iron for approximately 5–8 seconds. The paper backing may then be removed.

Then, the pattern for the patch(es) is transferred to the fabric, by any convenient means. Typically, this will be done by tracing a master pattern using carbon paper or the like, but the pattern may be drawn freehand or some other method used.

Next, the patches are cut along the pattern and the edges bound with thread.

Preferably, these last two steps are combined by using a serging machine which will cut and bind simultaneously. The model 560ED serging machine, manufactured by Husqvarna, has been used successfully for this application. The machine is set for a stitch depth of approximately 3 to 7 mm (5 mm is preferred), and a stitch density of 2.5 to 5 stitches per cm (2 to 4 mm length) (3 stitches per cm is the preferred density, which is the same as 3 mm length).

The patch is applied to a sweatsuit by placing it on the desired location, transfer web against the garment. A damp press cloth is then placed over the patch, and is heated with a dry iron on "wool" setting for approximately 10 seconds.

Accordingly, it is to be understood that the embodiments of the invention herein described are merely illustrative of the application of the principles of the invention. Reference herein to details of the illustrated embodiments are not intended to limit the scope of the claims, which themselves recite those features regarded as essential to the invention.

I claim:

1. A method of making flexible iron-on patches comprising the steps of:

bonding a heat-fusible transfer web to the back of a soft pliable material, said transfer web being heavy enough to allow the patch to bond when it is ironed on while not significantly increasing the stiffness of the soft pliable material, transferring an outline pattern in the desired shape of the patch to the bonded transfer-web and soft pliable material, outting the edge of the patch along the outline pattern, binding the edge of the patch with thread using an overlock stitch having a density of 2.5 to 5 stitches per cm.

2. The method of claim 1 in which the soft pliable material is fleece material.

3. The method of claim 1 in which the heat-fusible transfer web is polyamide having a weight of approximately 24 grams/meter.

4. The method of claim 1 in which the edges are bound using a three thread overlock stitch.

5. The method of claim 1 in which the stitches have a depth of approximately 5 mm.

6. The method of claim 1 in which the stitch density is 3 stitches per cm.

7. The method of claim 1 in which the cutting and binding steps are done simultaneously using a serging machine.

* * * * *